(12) United States Patent
Looijen et al.

(10) Patent No.: US 10,732,064 B2
(45) Date of Patent: Aug. 4, 2020

(54) IMMERSION DEPTH MEASUREMENT DEVICE

(71) Applicant: FNV IP B.V., Leidschendam (NL)

(72) Inventors: Peter Nicolaas Looijen, Nootdorp (NL); Henk Nebbeling, Nootdorp (NL)

(73) Assignee: FNV IP B.V., Leidschendam (NL)

( * ) Notice: Subject to any disclaimer, the term of this patent is extended or adjusted under 35 U.S.C. 154(b) by 154 days.

(21) Appl. No.: 15/479,056

(22) Filed: Apr. 4, 2017

(65) Prior Publication Data

US 2017/0292889 A1    Oct. 12, 2017

(51) Int. Cl.
*G01L 15/00* (2006.01)
*G01L 13/00* (2006.01)
*G01L 7/00* (2006.01)
*G01L 19/00* (2006.01)

(52) U.S. Cl.
CPC ............ *G01L 15/00* (2013.01); *G01L 7/00* (2013.01); *G01L 13/00* (2013.01); *G01L 19/0038* (2013.01); *G01L 19/0084* (2013.01)

(58) Field of Classification Search
CPC .............................. G01C 13/008; G01C 13/00
See application file for complete search history.

(56) References Cited

U.S. PATENT DOCUMENTS

| | | | |
|---|---|---|---|
| 3,910,111 A * | 10/1975 | Mott | B63B 39/14 73/170.31 |
| 4,461,180 A * | 7/1984 | Hellouin de Menibus | G01L 19/0618 73/706 |
| 4,499,762 A * | 2/1985 | Bodge | G01L 19/0046 73/170.01 |
| 5,052,222 A * | 10/1991 | Stoepfel | G01C 13/008 114/244 |
| 5,709,247 A * | 1/1998 | Hutton | F15B 13/0814 137/597 |
| 5,791,187 A * | 8/1998 | Chang | G01C 13/008 73/290 R |
| 5,895,841 A | 4/1999 | Lowell | |
| 6,813,564 B2 * | 11/2004 | Eiken | G01C 13/00 702/5 |
| 6,904,798 B2 * | 6/2005 | Boucher | G01C 13/008 73/170.02 |
| 7,296,464 B2 * | 11/2007 | Hostetler | B63G 8/42 73/170.33 |
| 7,310,130 B2 * | 12/2007 | Eussen | G03F 7/70775 355/53 |
| 7,562,580 B2 * | 7/2009 | Rezgui | G01L 9/0055 73/715 |
| 7,673,518 B2 * | 3/2010 | Kurtz | G01L 13/025 73/716 |
| 7,765,875 B2 * | 8/2010 | Guo | G01L 9/0072 73/718 |
| 7,823,604 B2 * | 11/2010 | Nambu | F02M 21/0239 137/240 |

(Continued)

*Primary Examiner* — Tran M. Tran
(74) *Attorney, Agent, or Firm* — Peacock Law P.C.; Janeen Vilven

(57) ABSTRACT

Immersion depth measurement device comprising a first absolute pressure sensor and a second differential pressure sensor, wherein the first and the second pressure sensor are arranged to measure ambient pressures, and wherein the second differential pressure sensor connects to the ambient through two separate channels, at least one of which is closable.

5 Claims, 1 Drawing Sheet

(56) References Cited

U.S. PATENT DOCUMENTS

| | | | | |
|---|---|---|---|---|
| 7,895,890 B2* | 3/2011 | Van Ee | ................ | G01F 23/165 |
| | | | | 73/290 R |
| 7,962,294 B2* | 6/2011 | Dozoretz | ................ | G01L 13/00 |
| | | | | 702/45 |
| 8,024,976 B2* | 9/2011 | Kurtz | ................ | G01L 19/0038 |
| | | | | 73/713 |
| 8,306,676 B1* | 11/2012 | Ingvalson | .............. | G01C 21/20 |
| | | | | 244/180 |
| 8,718,954 B2* | 5/2014 | von Blumenthal | ...... | G01N 1/24 |
| | | | | 702/47 |
| 8,825,430 B2* | 9/2014 | Mulligan | ............ | E21B 41/0007 |
| | | | | 702/100 |
| 9,010,191 B2* | 4/2015 | Strei | ................... | G01L 9/0042 |
| | | | | 73/716 |
| 9,562,796 B2* | 2/2017 | Lull | ..................... | G01L 19/0092 |
| 9,869,600 B2* | 1/2018 | Haldorsen | ............... | G01L 13/02 |
| 10,385,679 B2* | 8/2019 | Wang | ................ | E21B 41/0007 |
| 10,466,125 B2* | 11/2019 | Wagner | ................ | G01L 9/0055 |
| 2007/0005461 A1 | 1/2007 | Nambu | | |
| 2009/0178491 A1* | 7/2009 | McKitterick | ........... | G01W 1/00 |
| | | | | 73/861.47 |
| 2016/0281460 A1* | 9/2016 | Wang | ................ | E21B 41/0007 |
| 2016/0298575 A1* | 10/2016 | Chaput | .............. | G01L 19/0092 |
| 2016/0311687 A1* | 10/2016 | Dempster | ............. | C01B 13/115 |

* cited by examiner

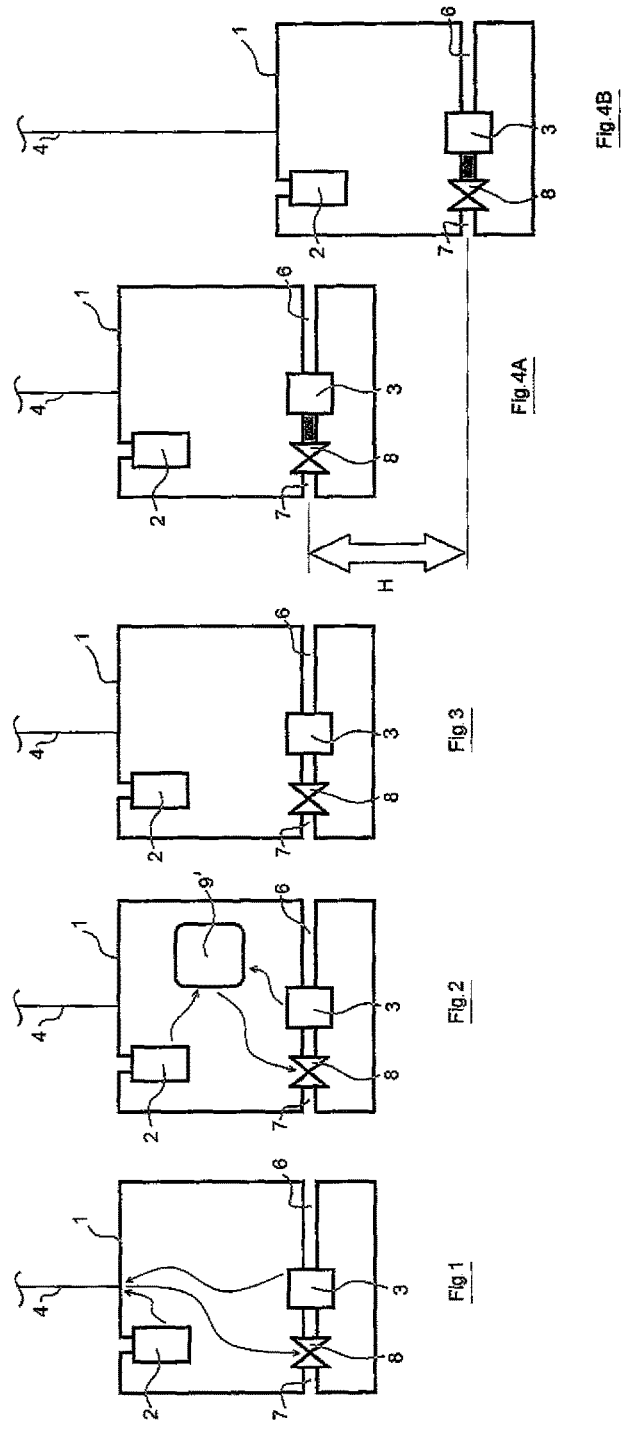

IMMERSION DEPTH MEASUREMENT DEVICE

CROSS-REFERENCE TO RELATED APPLICATIONS

This application claims priority to and the benefit of the filing of Netherlands Patent Application No. 2016557, filed on Apr. 6, 2016, and the specification and claims thereof are incorporated herein by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION BY REFERENCE OF MATERIAL SUBMITTED ON A COMPACT DISC

Not Applicable.

STATEMENT REGARDING PRIOR DISCLOSURES BY THE INVENTOR OR A JOINT INVENTOR

Not Applicable.

COPYRIGHTED MATERIAL

Not Applicable.

BACKGROUND OF THE INVENTION

Field of the Invention (Technical Field

The present invention relates to an immersion depth measurement device comprising a first ab-solute pressure sensor and a second differential pressure sensor.

Description of Related Art Including Information Disclosed Under 37 C.F.R. §§ 1.97 and 1.98

U.S. Pat. No. 7,698,950 discloses a measurement device which employs two pressure sensors to measure an absolute pressure of a process. U.S. Pat. No. 7,698,950 further relates the use of this known device to offshore bathymetry on the sea bottom, wherein one side of a membrane of the first pressure sensor is exposed to the seawater and the first sensor therefore measures the difference between an ambient pressure inside the housing and the water pressure on the sea bottom. An absolute pressure transducer is further connected to a receiver on the ocean surface wherein a third sensor can be arranged together with the receiver and its signal be used as a compensation value.

When employing an immersion depth measurement device which is to be used in deep-sea it is difficult to accurately measure the pressure below water level when use is made of conventional solutions. Conventionally a single analog pressure sensor is used and the signal thereof is digitized, which means that the resolution of the digitized pressure signal will be poor since it has to cover the entire possible depth of the immersion depth measurement device below sea level. Accordingly also the signal-to-noise ratio is poor for small pressure changes.

BRIEF SUMMARY OF THE INVENTION

It is an object of the invention to provide an immersion depth measurement device which has improved signal-to-noise ratio and which enables very accurate relative pressure measurement at an arbitrary but known depth below sea level.

For this purpose it is according to the invention proposed to implement the immersion depth measurement device with the features of one or more of the appended claims.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

FIG. 1 shows a first embodiment of an immersion depth measurement device according to the invention;

FIG. 2 shows a second embodiment of an immersion depth measurement device according to the invention;

FIG. 3 shows an immersion depth measurement device of the invention when initially lowering the device be-low sea water level; and FIGS. 4A and 4B show the immersion depth measurement device of FIG. 3 during measurement in deep-sea.

FIG. 5 illustrates a boat at the surface relative to an immersion depth measurement device of FIG. 1, FIG. 2, FIG. 3, FIG. 4A or FIG. 4B.

DETAILED DESCRIPTION OF THE INVENTION

In a first aspect of the invention the immersion depth measurement device comprises hydrostatic measurement means with a first absolute pressure sensor and a second differential pressure sensor, wherein the first and the second pressure sensor are arranged to measure ambient water pressures, and wherein the second differential pressure sensor connects to the ambient through two separate channels, at least one of which is closable. Accordingly the first absolute pressure sensor can be used to measure and determine the depth of the device below sea level, whereas the second differential pressure sensor can be used to accurately measure relative pressure differences when the altitude of the device is varied after closing off of one of the two separate channels at the desired depth of the device as measured with the first absolute pressure sensor. Since the range of the second differential pressure sensor can be limited to the maximum distance at which the altitude of the immersion depth measurement device will be varied around the desired depth of the device, its resolution can be high and it will accordingly have a high signal-to-noise ratio.

In order to enable easy closing off of one of the two separate channels it is preferred that at least one of the two separate channels is provided with a valve.

To enable measuring the pressure differences below sea level it is further preferred that a line is connected or connectable to the device to arrange that the device is submersible in deep-sea with said line connected to a point above water level.

Beneficially the line provides for guiding measurement signals from the first and second pressure sensors to above water level, where the line is connectable or connected to recording and control means to monitor and record the pressures measured by the first and second pressure sensors.

To close off one of the two channels of the second pressure sensor, in one embodiment said line further enables to manually or automatically switch from above water level the closable channel to a closed position depending on a pressure sensed with the first absolute pressure sensor.

In another embodiment the device itself is provided with recording and control means to monitor and record the pressures measured by the first and second pressure sensors, and to automatically switch the closable channel to a closed position depending on a pressure sensed with the first absolute pressure sensor.

The invention will hereinafter be further elucidated with reference to the drawing of an exemplary embodiment of an immersion depth measurement device according to the invention that is not limiting as to the appended claims.

Whenever in the figures the same reference numerals are applied, these numerals refer to the same parts.

FIG. 1 shows a first embodiment of an immersion depth measurement device 1 of the invention, comprising a first absolute pressure sensor 2 and a second differential pressure sensor 3. Likewise FIG. 2 shows a second embodiment of such an immersion depth measurement device 1 with a first absolute pressure sensor 2 and a second differential pressure sensor 3. In both embodiments of FIG. 1 and FIG. 2 the first pressure sensor 2 and the second pressure sensor 3 are arranged to measure ambient water pressures, wherein the second differential pressure sensor 3 connects to the ambient through two separate channels 6, 7, at least one of which is closable. In the shown embodiments, it is channel 7 that is provided with a valve 8 to enable closing off of this channel 7.

In both embodiments shown in FIG. 1 and FIG. 2 the first absolute pressure sensor 2 is used to measure the depth of the device 1 below sea level. This is illustrated in FIG. 3 which shows the situation which is present upon initial lowering of the device 1 below water level wherein the first absolute pressure sensor 2 is used for measuring the depth of the device 1. At that time both channels 6, 7 of the second differential pressure sensor 3 are open and accordingly the sensor 3 does not record any pressure difference. When the device 1 has reached the desired altitude as measured with the first absolute pressure sensor 2, the valve 8 is used to close off the channel 7 of the second differential pressure sensor 3, which sensor 3 can then be used to accurately measure differential pressures when the altitude of the device 1 is varied around the desired depth of the device 1 as measured with the first absolute pressure sensor 2. This situation is shown in FIGS. 4A and 4B. Since the range of the second differential pressure sensor 3 can be limited to the maximum distance at which the altitude of the device 1 will then be varied as illustrated in FIGS. 4A and 4B, its resolution can be high and it will accordingly have a high signal-to-noise ratio.

The difference between the embodiment of FIG. 1 and the embodiment of FIG. 2 is that although in both cases a line 4 is connected or connectable to the device 1 to arrange that the device 1 is submersible in deep-sea with said line 4 connected to a point 5 above water level, in FIG. 1 the line 4 also provides for guiding measurement signals from the first pressure sensor 2 and second pressure sensor 3 to above water level, whereas in FIG. 2 the line 4 only provides for suspension of the device 1.

In the embodiment of FIG. 1 the line 4 is connectable or connected to recording and control means 9 above water level to monitor and record the pressures measured by the first and second pressure sensors 2, 3. Also in this embodiment said line 4 enables to manually or automatically switch from above water level the closable channel 7 of the submerged device 1 to a closed position depending on a pressure sensed with the first absolute pressure sensor 2.

In the embodiment of FIG. 2 the submersible device 1 is itself provided with recording and control means 9' to monitor and record the pressures measured by the first and second pressure sensors 2, 3, which recording and control means 9 are arranged to automatically switch the closable channel 7 to a closed position depending on a pressure sensed with the first absolute pressure sensor 2.

Although the invention has been discussed in the foregoing with reference to exemplary embodiments of the immersion depth measurement device of the invention, the invention is not restricted to these particular embodiments which can be varied in many ways without departing from the invention. The discussed exemplary embodiments shall there-fore not be used to construe the appended claims strictly in accordance therewith. On the contrary the embodiments are merely intended to explain the wording of the appended claims without intent to limit the claims to these exemplary embodiments. The scope of protection of the invention shall therefore be construed in accordance with the appended claims only, wherein a possible ambiguity in the wording of the claims shall be resolved using these exemplary embodiments.

What is claimed is:

1. An immersion depth measurement device comprising a housing and a hydrostatic measurement means with a first absolute pressure sensor and a second differential pressure sensor, both the first absolute pressure sensor and the second differential pressure sensor are supported by the housing, wherein the first absolute pressure sensor is configured to measure an absolute pressure of ambient water representative for a depth of said device below water level, wherein the second differential pressure sensor is arranged to measure differential water pressures and connects to the ambient water through two separate channels, at least one of the two separate channels forming a closeable channel that is provided with a valve which is configured to be operatively closable to close off the closeable channel;

the device being in signal communication with a controller that is configured to monitor the absolute and differential pressures measured by the first absolute pressure sensor and the second differential pressure sensor respectively, the controller further being configured to operate the valve to automatically switch the closable channel to a closed position in response to a predetermined pressure condition being sensed by the first absolute pressure sensor, the predetermined pressure condition representing a desired immersion depth of the device.

2. The immersion depth measurement device according to claim 1, wherein a line is connected or connectable to the device.

3. The immersion depth measurement device according to claim 2, wherein the line provides for guiding measurement signals from the first and second pressure sensors to above water level, where the line is connectable or connected to the controller to monitor and record the pressures measured by the first and second pressure sensors.

4. The immersion depth measurement device according to claim 2, wherein said line enables manually or automatically switching the operatively closable channel to a closed position depending on a pressure sensed with the first absolute pressure sensor.

5. A method for using an immersion depth measurement device according to claim 1, the method comprising:
   initially lowering the device into the water;
   while lowering the device further in the water, repeatedly measuring the absolute pressure of the ambient water with the first absolute pressure sensor, while monitoring with the controller the absolute pressure measured by the first absolute pressure sensor to determine whether the first absolute pressure sensor senses the predetermined pressure condition indicating that the device has reached the desired immersion depth;
   when the device has reached the desired immersion depth, first allowing the valve and the closeable channel of the second differential pressure sensor to be open to let a volume of water inside the closeable channel obtain a pressure prevailing at the desired immersion depth, followed by operating the valve with the controller to close off the closeable channel; and
   after closing the closeable channel, repeatedly measuring with the second differential pressure sensor the differential pressure between the volume of water inside the closeable channel and ambient water via another one of the two separate channels, said differential pressure representing a change in actual immersion depth of the device relative to the desired immersion depth.

* * * * *